(12) United States Patent
Potter et al.

(10) Patent No.: US 7,194,975 B2
(45) Date of Patent: Mar. 27, 2007

(54) UNMANNED UNDERWATER VEHICLE HEALTH MONITORING SYSTEM AND METHOD

(75) Inventors: Calvin C. Potter, Mesa, AZ (US); Sharon K. Brault, Chandler, AZ (US); Paul T. Wingett, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 122 days.

(21) Appl. No.: 10/936,954

(22) Filed: Sep. 8, 2004

(65) Prior Publication Data

US 2006/0005758 A1 Jan. 12, 2006

Related U.S. Application Data

(60) Provisional application No. 60/529,350, filed on Dec. 11, 2003.

(51) Int. Cl.
*B63G 8/00* (2006.01)
(52) U.S. Cl. .................................................. 114/312
(58) Field of Classification Search ................ 114/312
See application file for complete search history.

(56) References Cited

U.S. PATENT DOCUMENTS

| 3,626,372 | A | 12/1971 | Chayt |
| 4,202,034 | A | 5/1980 | Bowditch et al. |
| 5,339,288 | A | 8/1994 | Blier et al. |
| 5,579,285 | A | 11/1996 | Hubert |
| 5,724,241 | A | 3/1998 | Wood et al. |
| 5,995,882 | A | 11/1999 | Patterson et al. |
| 6,317,055 | B1 | 11/2001 | Fujisawa |
| 6,390,012 | B1 * | 5/2002 | Watt et al. .................. 114/322 |
| 6,474,254 | B1 | 11/2002 | Ambs et al. |

* cited by examiner

*Primary Examiner*—Jesus D. Sotelo
(74) *Attorney, Agent, or Firm*—Ingrassia Fisher & Lorenz

(57) ABSTRACT

A health monitoring system for an unmanned underwater vehicle (UUV) is disposed within a submerged docking station. The health monitoring system receive signals representative of performance of the docking station equipment and uses the data to determine the health status of the docking station equipment, to generate health status data representative thereof, and transmits the health status data to a remote station. The health monitoring system also retrieves health status data from UUVs that are periodically docked in the docking station, and transmits this data to the remote station.

17 Claims, 7 Drawing Sheets

UNMANNED UNDERWATER VEHICLE HEALTH MONITORING SYSTEM AND METHOD

CROSS-REFERENCES TO RELATED APPLICATIONS

This application claims the benefit of U.S. Provisional Application No. 60/529,350, filed Dec. 11, 2003.

FIELD OF THE INVENTION

The present invention relates to unmanned underwater vehicles and, more particularly, to a health monitoring system and method that may be used to monitor the health of various systems within an unmanned underwater vehicle (UUV) docking station, and on-board a UUV while the UUV remains submerged.

BACKGROUND OF THE INVENTION

Unmanned underwater vehicles (UUVs) may be used to conduct various military and non-military operations. Such operations may include, for example, maritime reconnaissance, undersea searching, undersea surveying, submarine tracking and trailing, monitoring of various types of sea traffic, monitoring animal and plant life, and communication and/or navigational aids. These and other operational capabilities make UUVs a potential option in providing a seagoing component for homeland security. In a homeland security scenario, multiple UUVs could be deployed along the coasts of the country, and conduct various security-related monitoring and surveillance operations.

For most military and homeland security operations, it may be desirable that the UUVs remain submerged for relatively long periods of time. As such, many UUVs may include a power plant that is powered by a power source that can generate a desired level of power while the UUV remains submerged, while at the same time generating a relatively low level of acoustic noise. Various types of power sources have been used and/or developed that meet one or more of these objectives. Some examples include batteries, and rechargeable heat sources. Although batteries and rechargeable heat sources may be advantageous from a cost standpoint, both of these types of power sources may need periodic recharging.

In addition to the need to be periodically recharged or refueled, at some point during UUV operation, it may be desirable to determine the health status of equipment on-board the UUV to verify proper system operation, determine the need for maintenance, and track or predict system degradation. It may additionally be desirable to determine the health status of equipment installed in a UUV docking station for at least the same reasons.

In many current UUVs, in order to determine UUV equipment health status, the UUV may be periodically retrieved, and taken out of service. In many instances, this results in the UUV being surfaced and removed from the water in order to conduct these determinations. Moreover, some current dockings stations may be periodically taken out of service to inspect on-board equipment to determine if maintenance should be conducted. In both instances, this can be a costly and time-consuming operation, and can reduce overall mission effectiveness.

Hence, there is a need for a system and method that will assist in determining the health status of equipment on-board a UUV and/or a UUV docking station without having to surface the UUV and remove it from the water, and without having to remove the docking station from service. The present invention addresses one or more of these needs.

SUMMARY OF THE INVENTION

The present invention provides a system and method for determining the health status of UUV and docking station equipment, without having to surface the UUV and remove the UUV or docking station from service.

In one embodiment, and by way of example only,

Other independent features and advantages of the preferred health monitoring system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
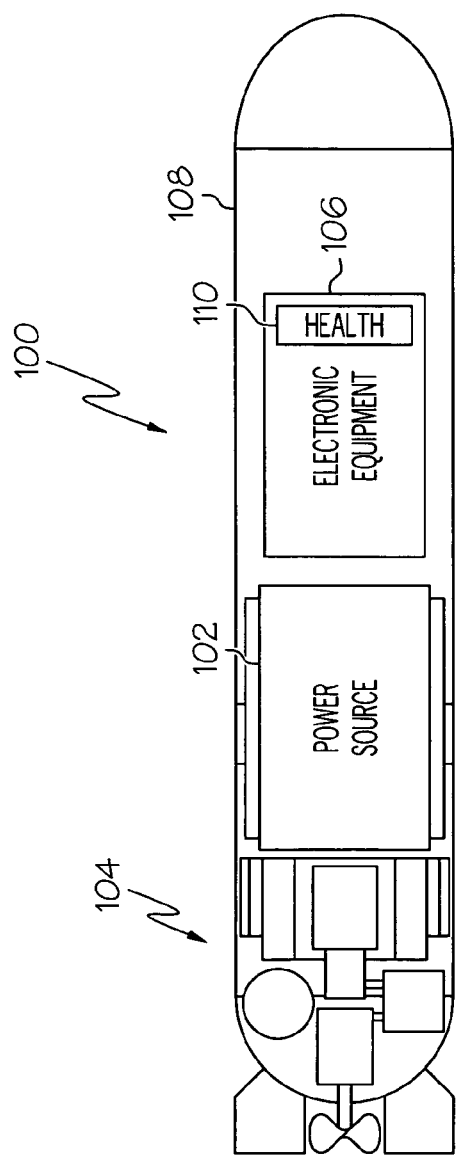
FIG. 1 is a simplified functional block diagram representation of an exemplary unmanned underwater vehicle (UUV)

An exemplary embodiment of an unmanned underwater vehicle (UUV) 100 is shown in FIG. 1, and includes a power source 102, a power plant 104, and on-board electronic equipment 106, all housed within a hull 108. The power source 102 is a rechargeable power source and is used to supply power to the power plant 104. The power source 102 may be any one of numerous types of rechargeable power sources such as, for example, a rechargeable heat source for driving a closed Brayton cycle (CBC), and/or a battery. If a rechargeable heat source is used, it may be any one of numerous types of rechargeable heat sources such as, for example, a porous solid or a molten salt. Similarly, if a battery is used, it may be any one of numerous types of rechargeable batteries such as, for example, a lead-acid battery, a nickel-cadmium battery, or a lithium battery.

The power plant 104 uses the power supplied from the power source 102 to generate propulsion power and electrical power for the UUV 100. Thus, the power plant 104 preferably includes one or more turbines, generators, and/or motors to supply the needed propulsion and electrical power. It will be appreciated that the particular number, type, and configuration of equipment and components used to implement the power plant 104 may vary depending on the specific power source 102 that is used.

The on-board electronic equipment 106 may also vary, depending on the purpose and mission of the UUV 100, the configuration of the power source 102, and/or the configuration of the power plant 104. No matter the particular type of electronic equipment 106 that is used, or its particular configuration, the on-board electronic equipment 106 is preferably configured to gather and store data regarding various equipment and systems on-board the UUV 100, including the power source 102 and power plant 104, as well as data associated with the mission of the UUV 100. Included among this data are performance related data, which the on-board electronic equipment 106 processes, and generates health status data representative of the health of the various UUV equipment and systems. In the depicted embodiment, a UUV health monitor circuit 110 is used to implement this function. The on-board electronic equipment 106 is also preferably configured to transmit some or all of the data it gathers and stores to, and/or to receive various types of data from, a remote station (not illustrated).

Figure 2:
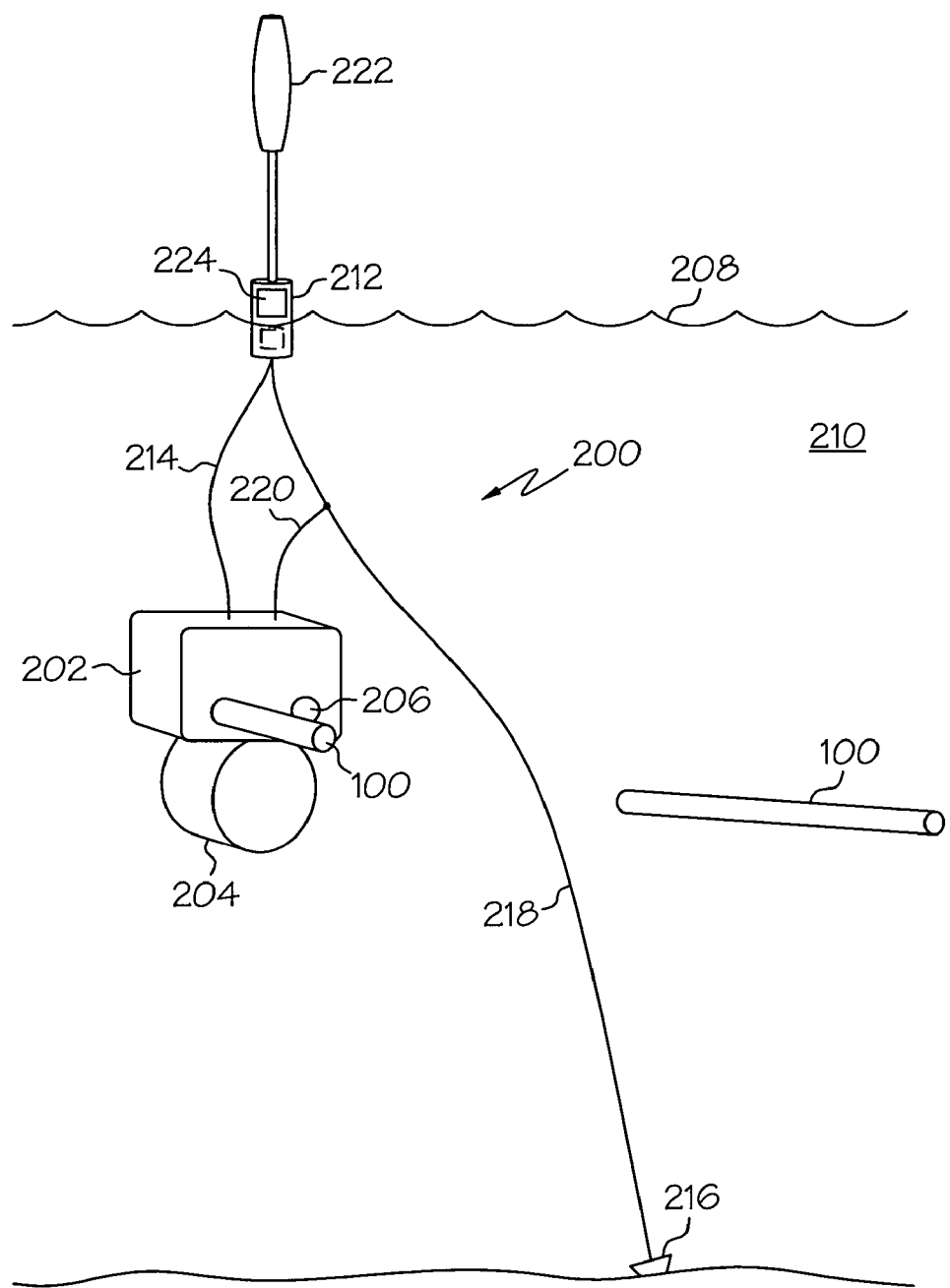
FIG. 2 is a simplified perspective view of an exemplary UUV docking station that may be used to dock one or more UUVs, such as the exemplary UUV shown in FIG. 1.

The UUV power source 102 can be recharged, and data can be transferred to/from the on-board electronic equipment 106, whenever the UUV 100 is docked in a docking station. An exemplary embodiment of a docking station 200 is illustrated in FIG. 2, and includes a housing 202, one or more buoyancy tanks 204, and one or more docking ports 206. When deployed, the docking station 200 is preferably submerged below the surface 208 of the body of water 210 in which it is placed, and is tethered to a surface buoy 212 via a tether line 214. The tether line 214 may be any one of numerous types of tether lines 214 that preferably include one or more sets of conductors for transmitting data between the surface buoy 212 and the docking station 200, and may additionally include one or more conduits for supplying fuel and/or air to the docking station 200. The position of the surface buoy 212 is maintained using an anchor 216 that is coupled to the surface buoy 212 via an anchor line 218. An additional length of anchor line 220 may also be coupled between the docking station 200 and the surface buoy anchor line 218.

The surface buoy 212 may be an existing surface buoy 212 or may be specifically designed to interface with the docking station 200. In either case, the surface buoy 212 preferably includes one or more antennae 222 for transmitting data to and receiving data from the previously-mentioned remote station. The surface buoy 212 also preferably includes one or more transceivers 224 configured to transmit data to and receive data from the non-illustrated remote station. The transceivers 224, or separate transceivers, are also preferably configured to transmit data to and receive data from the on-board electronic equipment 106 in a docked UUV 100. It will be appreciated that the surface buoy 212 also preferably includes one or more fuel and/or air connections, which are used to service the submerged docking station 200.

The buoyancy tank 204 is coupled to the docking station housing 202 and, in the depicted embodiment, is disposed external to the housing 202. It will be appreciated that the docking station 200 could include more than one buoyancy tank 204, and that the one or more buoyancy tanks 204 could be disposed either within or external to the housing 202. Moreover, depending on the configuration of the UUV power source 102, the buoyancy tank 204 may also function as a storage tank for fuel.

The docking ports 206 are disposed within the docking station housing 202 and are each configured to receive, and dock, a single UUV 100 therein. In the depicted embodiment, the housing 202 is configured to include two docking ports 206; however, it will be appreciated that this is merely exemplary, and that the housing 202 could be configured to include more or less than this number of docking ports 206. Moreover, although the docking ports 206 are shown as being configured to receive and dock a single UUV 100 therein, it will be appreciated that one or more of the docking ports 206 could be configured to receive and dock more than one UUV 100.

Figure 3:
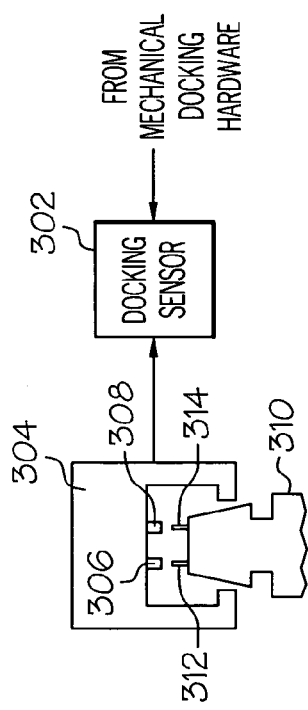
FIG. 3 is a simplified schematic representation illustrating exemplary mechanical and electrical interconnections between the UUV docking station and a UUV.

No matter the particular number of docking ports 206, or the particular number of UUVs 100 each docking port 206 can receive and dock, it will be appreciated that each docking port 206 includes hardware sufficient to mechanically capture a UUV 100, and to electrically couple to portions of the UUV 100. A simplified representation of a portion of this hardware 300 is shown in FIG. 3, and includes a docking sensor 302, and a docking connector 304. The docking sensor 302 is configured to sense when the UUV 100 is properly docked in the docking port 206. As will be described more fully below, the docking sensor 302 supplies an appropriate sensor signal to equipment within the docking station 200 indicating that the UUV 100 is properly docked, both mechanically and electrically.

Figure 4:
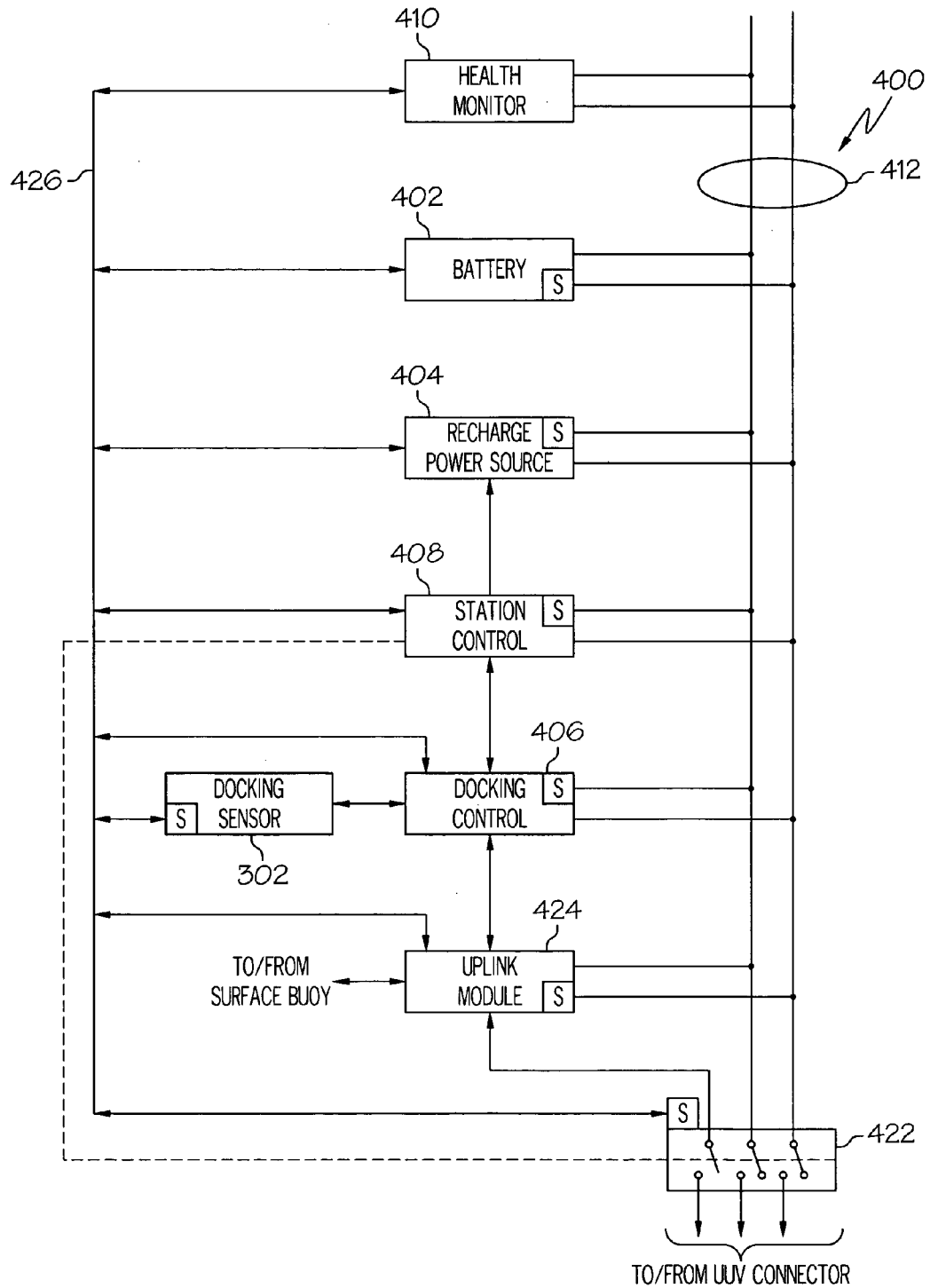
FIG. 4 is a functional block diagram of an exemplary charge and monitoring system that may be used to recharge a UUV while docked in the UUV docking station of FIG. 1.

The docking connector 304 includes a data port 306 and a power port 308. When the UUV 100 is properly docked within a docking port 206, the docking connector 304 is couple to a UUV connector 310, which also includes a data port 312 and a power port 314. The docking connector data port 306 and UUV connector data port 312 are configured to electrically couple together, as are the docking connector power port 308 and the UUV connector power port 314. The data connector ports 306, 312 are used to transmit data from, and/or supply data to, the on-board electronic equipment 106, and the power ports 308, 314 are used to supply electrical power to recharge the power source 102. The electrical power that is used to recharge the UUV power source 102, and the data that is transmitted to and from the on-board electronic equipment 106, is supplied from a charge and monitor system that preferably forms part of the docking station 200. A functional block diagram of the charge and monitor system is shown in FIG. 4, and will now be described.

The charge and monitor system 400 includes a battery 402, a recharge power source 404, a docking control circuit 406, a station control circuit 408, and a health monitor circuit 410. The battery 402 may be sized, and include a desired number of cells, to supply a desired voltage and current magnitude, and may be implemented as any one of numerous types of rechargeable batteries such as, for example, the battery types previously mentioned. The battery 402 is coupled to a power distribution bus 412, which is used to distribute electrical power to the station control circuit 408 and various other electrical and electronic equipment on or within the docking station 200. As will be described more fully below, the battery 402 supplies electrical power to the power distribution bus 412 whenever the recharge power source 404 is not being used to supply electrical power.

The recharge power source 404 is electrically coupled to the power distribution bus 412, and is used to generate electrical power to selectively recharge both the docking station battery 402 and the UUV power source 102. The recharge power source 404 may be implemented as any one or more of numerous types of power sources including, for example, a fuel cell or a fluid-powered turbine generator.

The docking control circuit 406 is coupled to the docking sensor 302, and is used to supply a signal representative of the docking state of a UUV 100. More specifically, when a UUV 100 is properly docked, and the docking connector 304 is coupled to the UUV connector 310, the docking sensor 302, as was noted above, issues an appropriate signal. This signal is supplied to the docking controller 406, which in turn supplies a UUV docking status signal to either, or both, the station control circuit 408 and the health monitor circuit 410. In the depicted embodiment, the UUV docking status signal is supplied to the station control circuit 408.

The station control circuit 408 controls the overall operational mode of the charge and monitor system 400. In the depicted embodiment, the station control circuit 408 controls the charge and monitor system 400 to operate in one of at least two separate operational modes, depending upon whether a UUV 100 is, or is not, docked in the docking station 200. In one operational mode, referred to herein as the "undocked mode," a UUV 100 is not docked in the docking station 200, and the charge and monitor system 400 is not used to charge a UUV 100, though the system 400 does monitor docking station health. In a second operational mode, which is referred to herein as the "docked mode," a UUV 100 is docked in the docking station 200, and the charge and monitor system 400 is used to charge/recharge a UUV 100, and to transfer data to/from a UUV 100, via the docking connector 304. Each of these operational modes, and the function implemented by the charge and monitor system 400 in each of these operational modes, will be described in more detail further below.

The health monitor circuit 410 continuously monitors the health of the various circuits, components, and subsystems on the docking station 200, in both the undocked and the docked operational modes. Thus, as shown in FIG. 4, the health monitor circuit 410 is coupled to continuously receive, among other things, performance related data from the battery 402, the recharge power source 404, the docking control circuit 406, the station control circuit 408, and the docking sensor 302. It will be appreciated that the performance data associated with a circuit, component, or subsystem, may be generated by one or more sensors (S) disposed adjacent, or coupled to, the circuit, component, or subsystem. In such instances, the sensors (S) may be configured to sense various physical parameters such as, for example, temperature, vibration, noise, pressure, voltage, or current, just to name a few. In addition to, or instead of, sensor generated data, the performance data may be generated by one or more circuits, devices, or software products, within or running on, the circuit, component, or subsystem.

No matter the specific source of the performance data, in the depicted embodiment it is seen that the health monitor circuit 410 receives the generated performance data via a common communication bus 426. It will be appreciated, however, that the data could be provided via independent communication paths between the health monitor circuit 410 and the individual circuits, components, and subsystems. It will additionally be appreciated that the performance data could be transmitted to the health monitor circuit 410 wirelessly.

As FIG. 4 additionally shows, the health monitor circuit 410 is also coupled to a control switch 422 and an uplink module 424. The control switch 422 is coupled between the power distribution bus 412 and the docking connector power port 308 (not shown in FIG. 4), and between the uplink module 424 and the docking connector data port 306 (also not shown in FIG. 4). As will be described further below, the position of the control switch 422 is controlled by the station control circuit 408, and thus selectively couples/decouples the power distribution bus 412 to/from the docking connector power port 308, and the uplink module to/from the docking connector data port 306.

The uplink module 424 functions, among other things, as a transceiver and is used to retrieve data from, and transfer data to, the UUV 100, via the docking and UUV data connector ports 306, 312. The uplink module 424 additionally receives data from various circuits in the docking station 200, including the health monitor circuit 410. The uplink module 420 is configured to transfer the data obtained from the UUV 100 and/or health monitor circuit 410 to the one or more transceivers 224 in the surface buoy 212, or to directly transmit the data to a remote station via the antenna 222. In some, or preferably all, instances, the uplink module 424 formats and encrypts the data prior to transmission.

Before proceeding with the description, it will be appreciated that the health monitor circuit 410 may be configured to receive performance data from various other circuits, components, and subsystems on, or within, the docking station 200, and not just those that are explicitly depicted in FIG. 4.

No matter the specific number of circuits, components, and subsystems that supply performance data, the health monitor circuit 410 is configured to process the received performance data and determine the health status of each circuit, component, and subsystem on the docking station 200. The health monitor circuit 410 is also preferably configured to generate health status data representative of the determined health status of each circuit, component, and subsystem on the docking station 200. The generated health status data is then transmitted, as noted above, to a remote station (not illustrated) via the uplink module 424. As will be described in more detail further below, the charge and health monitor system 400 is additionally configured to selectively receive, via the uplink module 424, health status data from one or more UUVs 100, which may then be transmitted, also via the uplink module 424, to a remote station.

Having described a particular embodiment of the charge and monitor system 400 from a structural standpoint, and having generally described the overall functionality of the charge and monitor system 400, a more detailed description of a process implemented by the charge and monitor system 400 to monitor the health of one or more UUVs 100 and the docking station 200 will be provided. In doing so, reference should be made, as appropriate, to FIGS. 1–4, in combination with FIGS. 5–9, which illustrate exemplary processes implemented by the charge and monitor system 400. It should be noted that the parenthetical reference numerals in the following description correspond to like reference numerals that are used to reference the flowchart blocks in FIGS. 5–9.

Figure 5:
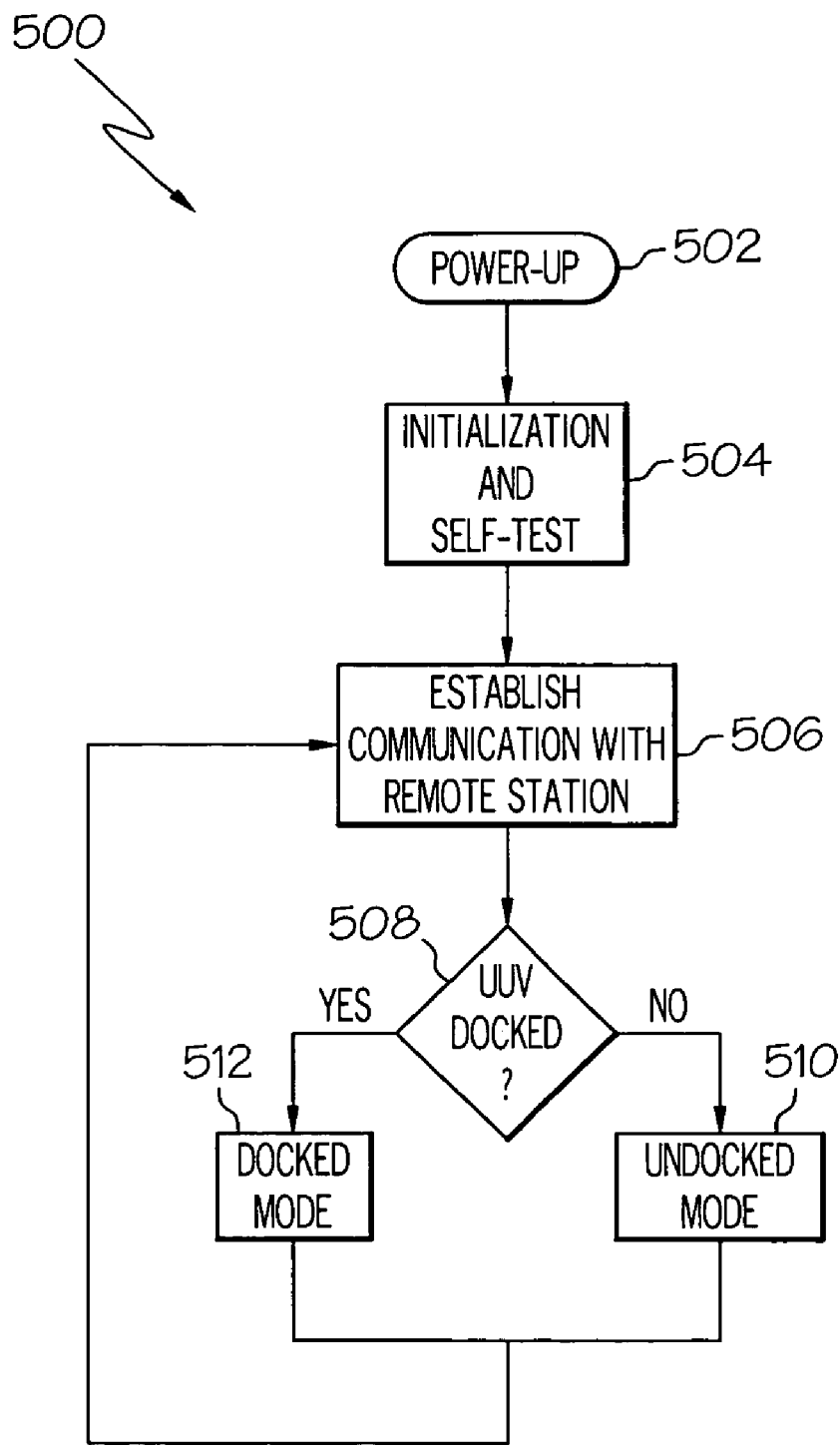
FIGS. 5–9 are flowcharts depicting the processes implemented by the charge and monitoring system shown in FIG. 4.
Figure 6:
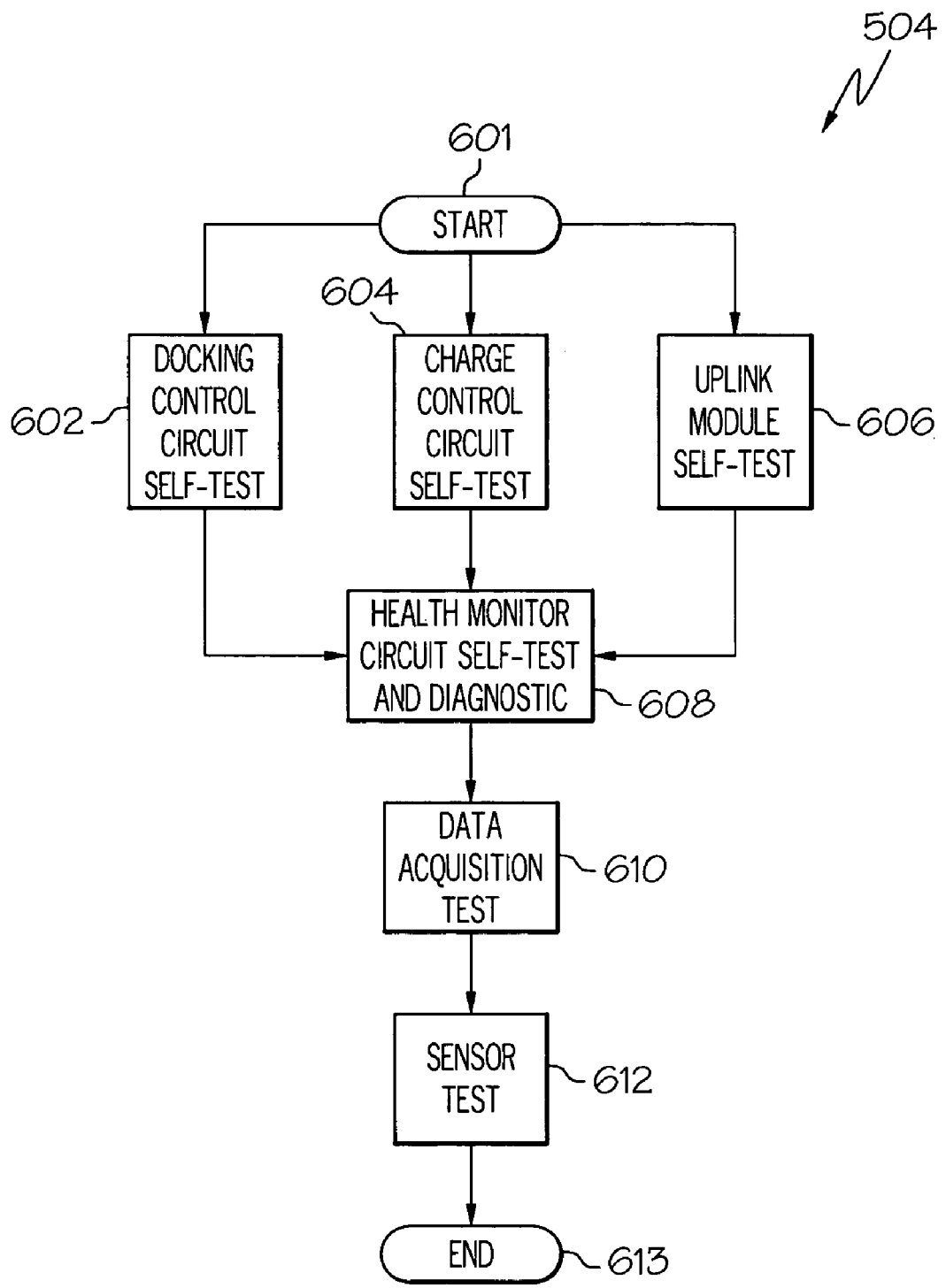
Figure 7:
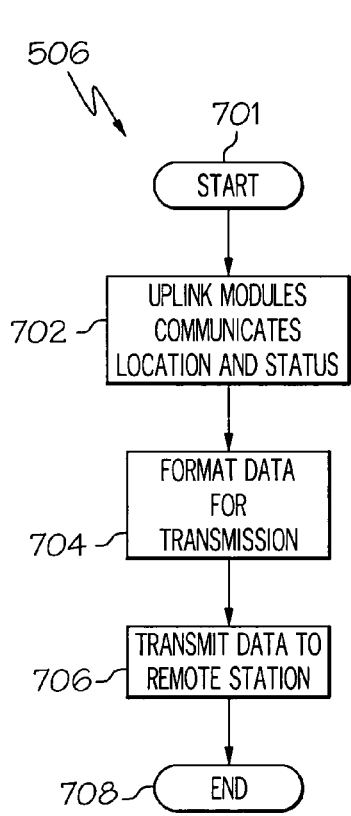
Figure 8:
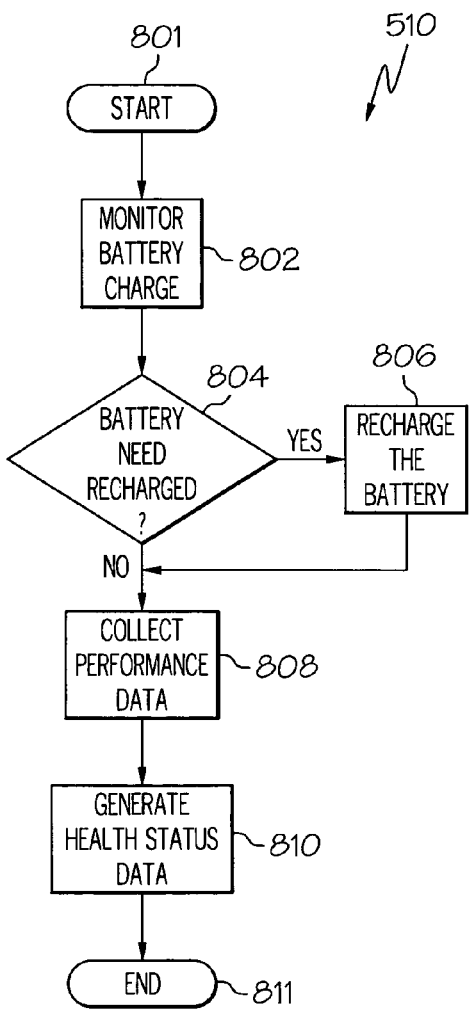
Figure 9:
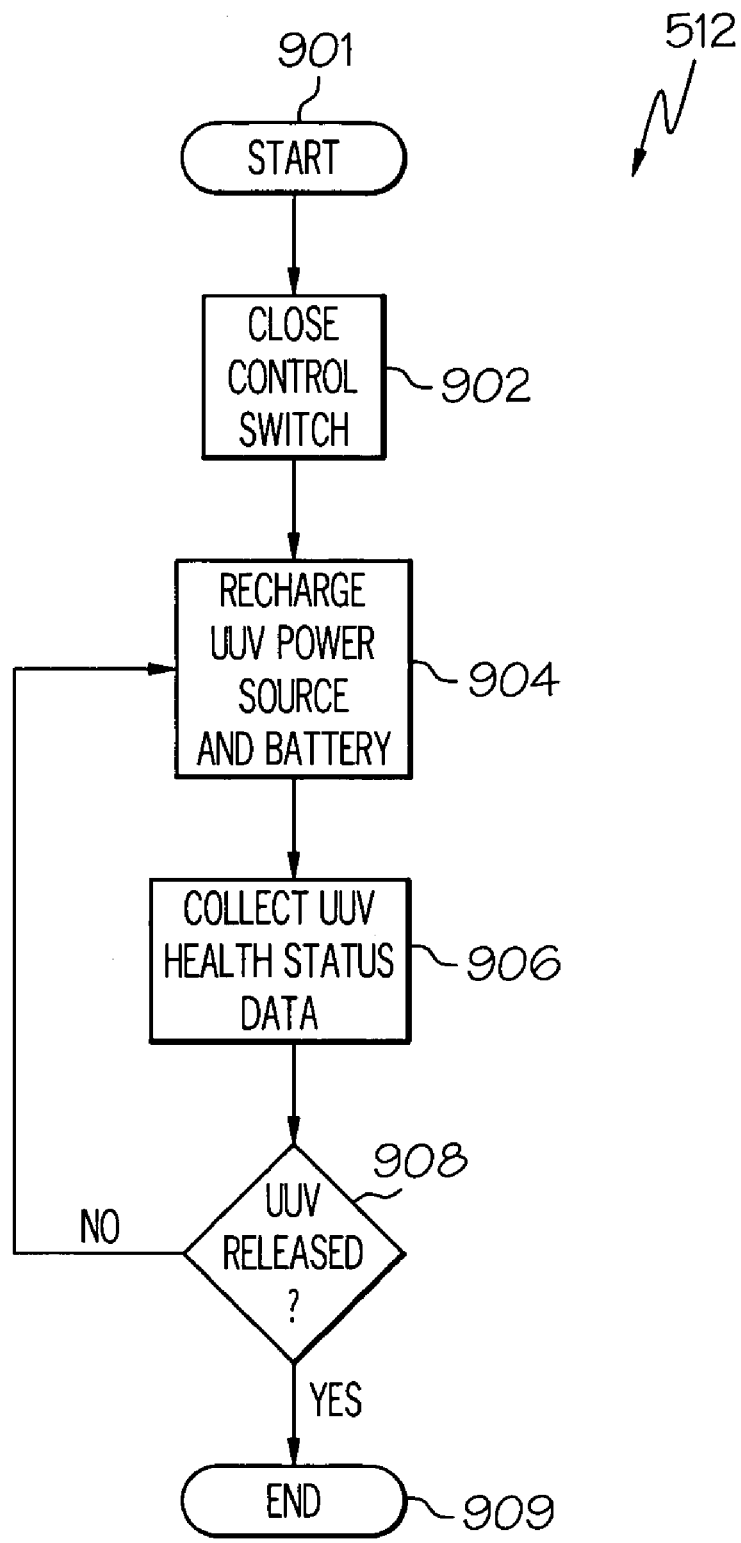

With reference first to FIG. 5, it is seen that the general process (500) implemented by the system 400 is initiated on system 400 power-up (502), and begins with an initialization and self-test subroutine (504). The initialization and self-test routine (504), which is shown in more detail in FIG. 6, includes individual self-test that are performed by, for example, the docking control circuit 406 (602), the station control circuit 408 (604), and the uplink module 424 (606). The health monitor circuit 410 also performs a self-test, and retrieves the results of the self-tests from the other circuits (608). Thereafter, the health monitor circuit 410 performs various data acquisition tests (610) and sensor tests (612), to ensure the data acquisition media, which in the depicted embodiment is the communication bus 426, and the sensors (S) are performing properly.

Returning once again to FIG. 5, once the initialization and self-test subroutine (504) is completed, the system 400 establishes communication with the non-illustrated remote station (506). During this part of the process (500), which is shown in more detail in FIG. 7, the system 400, via the uplink module 424, establishes communication with the remote station (402). Once communication is established with the remote station, the uplink module 424 communicates the location (e.g., coordinates) and status (e.g., docked or undocked mode) of the docking station 200 to the remote station (702). In addition, the uplink module 424 appropriately formats various data retrieved by the charge and monitoring system 400 according a preferred protocol (704), and transmits the retrieved data to the remote station (706). As previously alluded to, the preferred protocol includes encryption of the data before transmission thereof. When the uplink module 424 has transmitted all of the retrieved data to the remote station, the subroutine (506) ends, and returns to the main process (500).

With reference once again to FIG. 5, once communication with the remote station is established (506), the charge and monitor system 400 determines whether or not a UUV 100 is docked in the docking station 200 (508). In the depicted embodiment, and as was previously mentioned, the charge and monitoring system 400 determines whether or not a UUV 100 is docked or undocked based on a UUV docking status signal supplied from the docking control circuit 406. If a UUV 100 is not docked, the charge and monitor system 400 is configured to operate in the undocked mode and implement an undocked mode subroutine (510). If, on the other hand, one or more UUVs 100 are docked in the docking station 200, then the charge and monitor system 400 is configured to in the docked mode and implement a docked mode subroutine (512). The undocked (510) and docked (512) mode subroutines are illustrated in more detail in FIGS. 8 and 9, and will now be discussed in more detail, beginning with the undocked subroutine (510).

When the undocked mode subroutine (510) is implemented, the battery 402 is used to supply electrical power to the power distribution bus 412, and the health monitor circuit 410 collects and transmits performance data associated only with the charge and monitor system 400. More specifically, in the undocked mode, the station control circuit 408 monitors the state of charge of the battery 402 (802). If the battery 402 drops to a predetermined charge state (804), the station control circuit 408 initiates a recharge of the battery 402 by activating the recharge power source 404 and configuring it to supply electrical power to the power distribution bus 412 to thereby recharge the battery 402 (806).

In addition to maintaining the appropriate charge on the battery 402, during the undocked subroutine (510) the health monitor circuit 410 collects performance related data from the circuits, components, and subsystems in the docking station 200 (808). The health monitor circuit 410 processes the collected performance related data and generates health status data representative of the health status of each of the circuits, components, and subsystems in the docking station 200 (810). The undocked subroutine (510) then ends, and returns to the communication subroutine (506), during the implementation of which the health status data is transmitted, via the uplink module 424, to the remote station. It will be appreciated that in an alternative embodiment, the health status data is stored in a non-illustrated memory, and is periodically transmitted to the remote station, or is only transmitted in response to a request from the remote station.

When the docked mode subroutine (512) is implemented, the charge and monitor system 400 is used to charge/recharge a UUV 100, and to transfer data to/from a UUV 100, via the docking connector 304. More specifically, in the docked mode, the station control circuit 408, in response to a UUV docking status signal supplied from the docking control circuit, closes the control switch 422 so that the docking connector power port 308 is electrically coupled to the power distribution bus 412 (902), and activates and configures the recharge power source 404 to supply electrical power to the power distribution bus 412 to thereby recharge the UUV power source 102 and the battery 402 (904).

In addition to activating the recharge power source 404 during the docked subroutine (512), the station control circuit 408 also commands the uplink module 424 to collect UUV health status data from the UUV 100 (906) via the docking and UUV connector ports 306, 312. Once the UUV health status data is retrieved (906), the UUV power source 102 and the battery 402 are fully charged (904), and the UUV is released from the docking port 206 (908), the docked subroutine (512) ends, and returns to the communication subroutine (506) so that the health status data may be transmitted to the remote station.

Although not illustrated, it will be appreciated that during the docking mode subroutine (512) the uplink module 424 may retrieve data that is not health status data from, and transfer non-health status data to, the UUV 100, via the docking and UUV connector ports 306, 312. In such instances, the docked subroutine (512) continues until the UUV power source is recharged, the UUV is released from the docking port 206, the uplink module 424 completes its data transfers to and/or from the UUV 100, and the battery 402 is fully charged.

It will be appreciated that the charge and monitor system 400 is described herein as being installed in the docking station 200. It will be appreciated, however, that in an alternative embodiment the charge and monitor system 400 is installed in the surface buoy 212. In this embodiment, the electrical power the charge and monitor system 400 generates is supplied to the UUV 100 via the tether line 214. It will additionally be appreciated that although the docking control circuit 406, the station control circuit 408, the health monitor circuit 410, and the uplink module 424 are depicted as being implemented as individual circuit modules, it will be appreciated that the functions of all or some of these circuit modules could be implemented in a single circuit module.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A health monitoring system for an unmanned underwater vehicle docking station, comprising:
   a plurality of UUVs;
   a plurality of UUV equipment disposed within each of the UUVS;

an unmanned underwater vehicle (UUV) docking station having a plurality of docking station equipment disposed therein;

a monitor circuit adapted to receive signals representative of performance of the docking station equipment and signals representative of performance of the UUV equipment, the monitor circuit operable, upon receipt of the signals, to (i) determine a health status of the docking station equipment, (ii) generate docking station health status data representative of docking station equipment health, (iii) determine a health status of the UUV equipment and (iv) generate UUV health status data representative of UUV equipment health; and a transceiver circuit configured to receive at least the docking station health status data from the monitor circuit and transmit the docking station health status data to a remote station.

2. The system of claim 1, further comprising:

an electrical port adapted to electrically couple to at least one of the unmanned underwater vehicles (UUVs);

wherein to transceiver circuit is further coupled to receive a UUV docking signal that indicates at least when the electrical port is electrically coupled to at least a portion of the at least one UUV and operable, in response thereto, to (i) retrieve the UUV health status data from the docked UUV and (ii) transmit the UUV health status data to a remote station.

3. The system of claim 2, further comprising:

a UUV docking control circuit adapted to receive a signal representative of the docking status of the at least one UUV and operable, in response thereto, to supply the UUV docking signal.

4. The system of claim 1, wherein the transceiver circuit is further operable to transmit data representative of docking station location to the remote station.

5. The system of claim 1, further comprising:

one or more sensors coupled to selected ones of the docking station equipment, each sensor operable to supply the signals representative of the performance of the docking station equipment to which the sensor is coupled.

6. The system of claim 1, wherein the transceiver circuit is further operable to encrypt the health status data.

7. The system of claim 1, further comprising:

a station control circuit adapted to receive a UUV docking signal that indicates a UUV is docked in the docking station and operable, in response thereto, supply an operational mode signal.

8. The system of claim 1, further comprising:

an electrical port adapted to electrically couple to at least one of the unmanned underwater vehicles (UUVs); and a station control circuit coupled to receive a UUV docking signal that indicates at least when the electrical port is electrically coupled to at least a portion of the at least one UUV and operable, in response thereto, to supply a data retrieval command, wherein the transceiver circuit is further responsive to the data retrieval command to (i) retrieve the UUV health status data from the docked UUV and (ii) transmit the UUV health status data to a remote station.

9. The system of claim 8, further comprising:

a UUV docking control circuit adapted to receive a signal representative of the docking status of the at least one UUV and operable, in response thereto, to supply the UUV docking signal.

10. A health monitoring system for an unmanned underwater vehicle docking station, comprising:

a plurality of UUVs;

a plurality of UUV equipment disposed within each of the UUVS;

an unmanned underwater vehicle (UUV) docking station having a plurality docking station equipment disposed therein;

a monitor circuit adapted to receive signals representative of performance of the docking station equipment and signals representative of performance of the UUV equipment, the monitor circuit operable, upon receipt of the signals, to (i) determine a health status of the docking station equipment, (ii) generate docking station health status data representative of docking station equipment health, (iii) determine a health status of the UUV equjoment and (iv) generate UUV health status data representative of UUV equipment health; and a transceiver circuit configured to receive at least the docking station health status data from the monitor circuit, encrypt at least the docking station health status data, and transmit the encrypted docking station health status data to a remote station.

11. The system of claim 10, further comprising:

an electrical port adapted to electrically couple to at least one of the unmanned underwater vehicles (UUVs);

wherein the transceiver circuit is further coupled to receive a UUV docking signal that indicates at least when the electrical port is electrically coupled to at least a portion of the at least one UUV and operable, in response thereto, to (i) retrieve and encrypt the UUV health status data from the docked UUV and (ii) transmit the encrypted UUV health status data to a remote station.

12. The system of claim 11, further comprising:

a UUV docking control circuit adapted to receive a signal representative of the docking status of the at least one UUV and operable, in response thereto, to supply the UUV docking signal.

13. The system of claim 10, wherein the transceiver circuit is further operable to transmit data representative of docking station location to the remote station.

14. The system of claim 10, further comprising:

one or more sensors coupled to selected ones of the docking station equipment, each sensor operable to supply the signals representative of the performance of the docking station equipment to which the sensor is coupled.

15. The system of claim 10, further comprising:

a station control circuit adapted to receive a UUV docking signal that indicates a UUV is docked in the docking station and operable, in response thereto, to supply an operational mode signal.

16. The system of claim 10, further comprising:

an electrical port coupled to the UUV docking station and adapted to electrically couple to at least one of the unmanned underwater vehicles (UUVs); and a station control circuit coupled to receive a UUV docking signal that indicates at least when the electrical port is electrically coupled to at least a portion of the at least one UUV and operable, in response thereto, to supply a data retrieval command, wherein the transceiver circuit is further responsive to the data retrieval command to (i) retrieve and encrypt the UUV health status data from the docked UUV and (ii) transmit the encrypted UUV health status data to a remote station.

17. The system of claim 16, further comprising:
a UUV docking control circuit adapted to receive a signal representative of the docking status of the at least one UUV and operable, in response thereto, to supply the UUV docking signal.

* * * * *

UNITED STATES PATENT AND TRADEMARK OFFICE
CERTIFICATE OF CORRECTION

PATENT NO. : 7,194,975 B2 Page 1 of 1
APPLICATION NO. : 10/936954
DATED : March 27, 2007
INVENTOR(S) : Potter et al.

It is certified that error appears in the above-identified patent and that said Letters Patent is hereby corrected as shown below:

Column 9, line 21, "wherein to" should be changed to --wherein the--;
Column 9, line 47, ", supply" should be changed to --, to supply--;
Column 10, line 17, "equjoment" should be changed to --equipment--.

Signed and Sealed this

Seventh Day of August, 2007

JON W. DUDAS
*Director of the United States Patent and Trademark Office*